United States Patent
Pialot et al.

(10) Patent No.: US 11,878,446 B2
(45) Date of Patent: Jan. 23, 2024

(54) METHOD FOR MANUFACTURING ARTICLES MADE FROM CRUMB RUBBER

(71) Applicant: COMPAGNIE GENERALE DES ETABLISSEMENTS MICHELIN, Clermont-Ferrand (FR)

(72) Inventors: Frédéric Pialot, Clermont-Ferrand (FR); José Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 214 days.

(21) Appl. No.: 17/414,077

(22) PCT Filed: Dec. 6, 2019

(86) PCT No.: PCT/FR2019/052956
§ 371 (c)(1),
(2) Date: Jun. 15, 2021

(87) PCT Pub. No.: WO2020/128213
PCT Pub. Date: Jun. 25, 2020

(65) Prior Publication Data
US 2022/0040891 A1    Feb. 10, 2022

(30) Foreign Application Priority Data

Dec. 19, 2018   (FR) ........................................ 1873362
Feb. 1, 2019    (FR) ........................................ 1900986

(51) Int. Cl.
*B29C 43/00*   (2006.01)
*B29D 30/06*   (2006.01)
(Continued)

(52) U.S. Cl.
CPC ............ *B29C 43/006* (2013.01); *B29B 13/10* (2013.01); *B29C 43/52* (2013.01); *B29D 30/06* (2013.01);
(Continued)

(58) Field of Classification Search
None
See application file for complete search history.

(56) References Cited

U.S. PATENT DOCUMENTS 5,904,885 A * 5/1999 Arastoopour ......... B29C 43/006
264/912
2018/0361627 A1  12/2018 Merino Lopez et al.

FOREIGN PATENT DOCUMENTS

CN    106519284 A    3/2017
FR    2475458 A1     8/1981
WO    2017097859 A1  6/2017

OTHER PUBLICATIONS

International Search Report with translation and Written Opinion corresponding to PCT/FR2019/052956 dated Dec. 6, 2019.

* cited by examiner

*Primary Examiner* — Robert J Grun
(74) *Attorney, Agent, or Firm* — Dickinson Wright PLLC

(57) ABSTRACT

A process for manufacturing an article made of recovered rubber crumb is provided. According to the process:
a) crumb particles are mixed with particles of a solute;
b) a molded article is produced by molding the mixture from step a) in a closed mold under predetermined temperature and pressure conditions; and
c) the molded article is brought into contact with a solvent so as to dissolve at least one portion of the particles of said solute.

9 Claims, 3 Drawing Sheets

(51) Int. Cl.
_B29B 13/10_ (2006.01)
_B29C 43/52_ (2006.01)
_B29C 43/58_ (2006.01)
_B29K 105/00_ (2006.01)
_B29K 105/26_ (2006.01)

(52) U.S. Cl.
CPC ................ _B29C 2043/5808_ (2013.01); _B29C 2043/5816_ (2013.01); _B29K 2105/251_ (2013.01); _B29K 2105/26_ (2013.01)

METHOD FOR MANUFACTURING ARTICLES MADE FROM CRUMB RUBBER

This application is a 371 national phase entry of PCT/FR2019/052956, filed on 6 Dec. 2019, which claims the benefit of French Patent Application Nos. 1873362, filed 19 Dec. 2018, and 1900986, filed Feb. 1, 2019, the entire contents of which are incorporated herein by reference for all purposes.

BACKGROUND

1. Technical Field

The present invention relates to the manufacture of new articles from the rubber crumb recovered from used tires.

2. Related Art

Currently, the question of recycling end-of-life tires is increasingly being asked. The need which is felt more particularly is the capacity for reusing the material of the components or, in other words, for reprocessing with a view to recycling all or some of the material which constitutes a used tire.

When it is desired to recycle used tires, they are ground. The grinding is carried out in a machine fitted with powerful rotary shredding blades capable of grinding tires of different sizes and types. The ground materials obtained or, in other words, the fragments of cut used tires, have different sizes generally between 25 and 350 mm and an average composition identical to that of the original whole tire.

In order to recycle the material from which they are made, the ground materials are treated in a granulator where they are ground more finely to obtain granules therefrom. The granules result from a very fine grinding of the rubber contained in the fragments of used tires, generally after extraction of the textile fibres and metal threads contained in the tires. The granules thus obtained have a size of between 0.8 and 20 mm and consist of at least 50% rubber. The granules can then be ground more finely and dried to obtain rubber crumb. Rubber crumbs are particles resulting from the shredding and grinding of used tires, the steel and also the textile are extracted therefrom, and have an average size (D50) of between 100 µm and 800 µm.

Granules mixed with binders or resins are used in the manufacture of molded articles, in particular in the field of street furniture or in that of articles used for the construction of roadways. Similarly, when a vulcanizing agent is added to the crumb and they are mixed together in kneaders, it is possible to obtain, by press vulcanization, molded articles such as solid tires for containers, wheelbarrows, high-pressure cleaners, etc.

Document FR 2 475 458 describes a process for manufacturing articles made of recovered rubber which consists in depositing in a mold crumb mixed preferably with a vulcanizing agent, alone or as a mixture with an accelerator. The crumb according to this document has a size of greater than or equal to 900 microns and it is deposited alone or as a mixture in a mold while being subjected to a temperature of between 160° C. and 190° C. and a pressure ranging up to 500 bar for a certain period of time. The additives added to the crumb make it possible, depending on the proportion thereof, to adjust the rigidity of the articles thus obtained and above all to increase the tensile strength and the elongation of the articles obtained based on vulcanized crumb. The articles obtained have a density similar to that of vulcanized rubber.

SUMMARY

One objective of the invention is to overcome the drawbacks of the aforementioned documents and to provide an original solution for obtaining new articles from recovered rubber crumb, articles whose physical properties are very different from those of vulcanized rubber.

This objective is achieved by the invention which proposes a method for manufacturing an article made of recovered rubber crumb, characterized in that:
 a) crumb particles are mixed with particles of a solute;
 b) a molded article is produced by sintering the mixture from step a) alone in a mold under predetermined temperature and pressure conditions.

In other words, an article is produced by sintering a mixture of rubber crumb particles and solid particles of a powdery product of solute type, which particles have the property of dissolving in a solvent, but which remain in their initial state in the absence of this solvent. A recovered rubber crime is understood to mean a crumb which has been obtained by grinding already vulcanized tires, whether they are used or new. Generally, rubber crumbs result from a grinding or from a micronization of cured rubber compositions already used for a first application, for example in tires; they are a product of the recycling of materials. The crumb thus preferably consists of a composition based on at least one elastomer and a filler. A step of sintering this mixture is understood to mean a shaping of a predetermined amount of the abovementioned mixture by heating at a temperature below the vulcanization temperature of the grains forming it and at the same time pressurizing this amount of crumb in the cavity of a mold.

In order to guarantee the uniformity of the properties of the article in the mass thereof, it is important to produce a very homogeneous mixture of the particles forming it before sintering. Solid-state sintering of the mixture of rubber crumb grains and solute grains is then carried out. Agglutination is thus obtained by heating at a temperature below the vulcanization temperature of the rubber and pressurizing the grains of mixture which remain in the solid state throughout the sintering. Heating and pressurization of the grains of the mixture create a sintered agglomerate of these grains. Thus, the compression creates a physical coming together of the grains and the heating promotes molecular mobility and therefore this coming together. Under the effect of temperature, molecular mobility increases and gives rise to an intermolecular interaction of the type of van der Waals forces, which creates a strong physical bond or physisorption between the molecules of the various grains.

An article is thus obtained, the shape and dimensions of which are very precise, since they are defined by those of the sintering cavity of the mold, and the density of which is controlled, the latter being directly connected to mixture compaction pressure. It will also be noted that, in the absence of treatment with a solvent, that is to say when considering an article (or a portion of an article) which will have been obtained by sintering, in accordance with the invention, a mixture of rubber crumb and solid solute particles, but which will not yet have been exposed to the solvent, then a solid article is obtained which is much more rigid than if said article had been made of particles of rubber crumb alone. Indeed, the solid particles of solute are intrinsically more rigid than the particles of rubber crumb, since said solid particles of solute have a stiffness, in particular a compressive stiffness, greater than that of said particles of vulcanized rubber crumb, which are by nature highly elastic. Therefore, a compacted article obtained by sintering a mixture containing, in addition to the rubber crumb particles, rigid solute particles, that are still undissolved, incorporated between said rubber crumb particles, will generally have, advantageously, a resistance to deformation, and in particular a compressive stiffness, which is much greater than the resistance that this same article would have if it were obtained by sintering a mixture which contained only rubber crumb particles, without inclusions of solid solute particles.

Preferably, the molded article is brought into contact with a solvent so as to dissolve at least one portion of the particles of said solute. This makes it possible to dissolve a portion or all of the solute and to obtain a partial or complete porosity of the molded article.

Advantageously, the crumb particles have an average size of less than 800 μm.

It has been observed, during the tests carried out in the laboratory, that, when the size of the grains of the rubber crumb does not exceed 800 μm, the sintering can take place without addition of vulcanization additive or any other binder or binding additive between the grains. It is thus possible to obtain an article with very good mechanical strength properties and with a controlled density and a controlled chemical composition.

Preferably, the average size of the particles of the solute is equal to or less than that of the crumb particles. This makes it possible, assuming a homogeneous distribution of the two types of particles in the molding cavity, to better control the distribution of the pores in the volume of the article.

Advantageously, the proportion of solute in the mixture is between 1% and 80% of the total mass of the mixture. Thus, the tests carried out in the laboratory have shown that beyond these limits, either a friable article due to the decohesion of the particles forming it, or an article whose properties are too close to those of a sintered article based on recovered rubber crumb alone.

Preferably, said solvent is water and said solute is selected from: salt, a saccharide (or a sugar or any water-soluble sugar derivative), a water-soluble protein or a water-soluble polymer.

It is in fact possible to use various solvents from the prior art, such as organic solvents, etc. However, water is preferred because it is a cheap and ecological product which accepts a wide variety of powdered solutes that are compatible with sintering, and that are soluble in water, such as salt, a saccharide, a water-soluble protein or a water-soluble polymer. In addition, due to the presence of water in the ambient environment, for example on a road, the contact of a solid tire with a wet road makes it possible to dissolve the solute, for example the salt, which is on the outer surface of a solid tire and thus modify its grip properties.

Advantageously, the molded article from step b) obtained with a first mixture from step a) is placed in a second mold, introduced into which is a second mixture of crumb particles and said solute having a composition different from that of the first mixture and a new molded article is then produced from the two mixtures.

This solution makes it possible to obtain sintered articles with a chosen distribution of their physical properties in the volume of the article. It is thus possible for example to obtain an article with a rigid core and a more flexible casing.

Preferably, the mixture is introduced into the mold and is subjected to a nominal temperature of between 100° C. and 150° C. and to a nominal pressure of between 20 and 200 bar for a time of between 2 and 15 minutes. These process parameters make it possible to obtain sintered articles from the rubber crumb alone having the best mechanical properties.

The best results were obtained with crumb introduced into the mold and subjected to a nominal temperature of 120° C., at a pressure of 100 bar for a period of 10 minutes.

Advantageously, the process of the invention comprises a step of cooling the molded article in the mold. It has been observed that removing the article from the mold after cooling the article to a temperature markedly lower than the sintering temperature ensures better dimensional stability of the article which does not exhibit any swelling phenomenon after removal from the mold. Advantageously, the step of cooling the article in the mold takes place to a temperature below 50° C. and preferably to ambient temperature.

The objective of the invention is also achieved with an article produced from recovered rubber crumb comprising a proportion of between 1% and 80%, by mass, of particles of a solute.

Preferably, the article according to the invention is produced from recovered rubber crumb without the addition of a binding additive between the crumb particles, the average size of which does not exceed 800 μm.

In an alternative embodiment, the article of the invention comprises a first compact part, within which the solid particles of solute have not been exposed to the solvent and have therefore not been dissolved by said solvent, and which is therefore preferably solid, and a second part in the form of a foam, within which at least one portion of the solute particles have been dissolved by the solvent, thus creating cavities within said part of the article.

In another embodiment variant, the article of the invention consists of a foam.

BRIEF DESCRIPTION OF THE DRAWINGS

The invention will be understood better from the rest of the description, which is supported by the following figures.

DETAILED DESCRIPTION OF EXAMPLE EMBODIMENTS

Figure 1A:
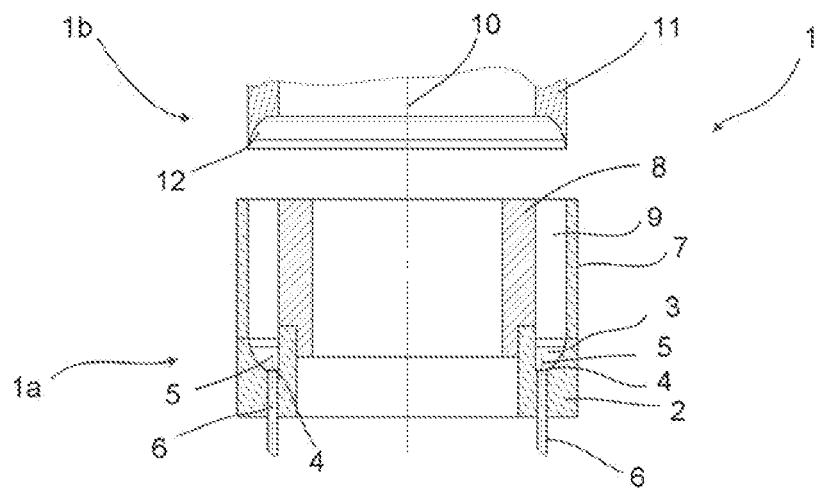
FIGS. 1a to 1e represent, in cross-sectional views, the various steps of the process of the invention.

In the various figures, elements that are identical or similar bear the same reference. Their description is therefore not systematically repeated.

The objective of the process of the invention is an article produced from recovered rubber crumb as a mixture with particles of solute. The crumb is obtained from crosslinked or vulcanized rubber, it being obtained by grinding a used or unused cured tire. Such a tire is selected from tires intended to equip a two-wheel vehicle, a passenger vehicle, or else a "heavy-duty" vehicle (that is to say, underground trains, buses, off-road vehicles, heavy road transport vehicles, such as lorries, tractors or trailers), or else aircraft, construction equipment, heavy agricultural vehicles or handling vehicles. The crumb used is that obtained by grinding a portion previously detached from the tire, for example from a tread, sidewalls, etc. or it is obtained by grinding the entire tire. In the latter case, it is stripped of textile or metal residues.

The composition of the crumb is thus produced based on at least one elastomer and a filler. Mention will in particular be made, as examples of fillers known as reinforcing to those skilled in the art, of carbon black or of a reinforcing inorganic filler, such as silica or alumina in the presence of a coupling agent, or mixtures thereof. The crumb may also comprise all the ingredients normally used in rubber compositions, such as plasticizers, antioxidants, vulcanization additives, etc.

The crumbs are simple ground rubber materials, without other treatment. The grinding to the stage of crumb of given size can be carried out by various technologies, in particular cryogenic impact micronization technologies, which make it possible to obtain particles of small size on rubber materials. Commercial items of equipment, such as the CUM150 mill from Netzsch or the CW250 mill from Alpine, can be used. Screening steps follow the grinding in order to select particles having a predetermined average size.

According to the invention, an article is produced from particles of rubber crumb mixed with particles of a solute by sintering without addition of a vulcanization additive or binder between the particles of the mixture. According to an advantageous aspect of the invention, of which the average size of the particles which form the mixture, here preferably before the compacting of said mixture during sintering, is less than or equal to 800 μm.

In a preferred embodiment of the invention, the solute is salt which is composed essentially of sodium chloride. The salt used is commercially available, for example of the type of salt used for de-icing, ground, washed, dried and screened. The particles used have an average size (D50) of less than or equal to 800 μm.

Once the desired size of the rubber particles and of the solute particles has been selected, the two materials are mixed. An essential condition for controlling the properties of the article to be obtained subsequently by sintering is the homogeneity of the mixture used. To do this, the desired amount of crumb particles and that of salt particles are placed in a container which is then placed in the basket of a three-dimensional dynamic mixer, such as a TURBULA® mixer from the company Willy A. Bachofen AG Maschinenfabrik. The container containing the mixture of particles is subjected to a three-dimensional movement continuously applying to the particles opposing and rhythmic movements of rotation, translation and inversion according to Schatz geometric theory, which results in a very homogeneous mixture of the two types of particles.

The mixture obtained is introduced into a mold in which a pressure is applied to it, in order to compact the crumb, of between 20 and 200 bar, preferably 100 bar and the temperature is brought to between 100° C. and 150° C., preferably 120° C. for a period of between 2 and 15 minutes, preferably 10 minutes. A sintered article is thus obtained having the desired dimensions and good mechanical properties, but more rigid than an article made of recovered rubber crumb alone.

The average size of the particles of the mixture of the invention, a mixture of rubber crumb and solute particles, is less than 800 μm. It has been found, surprisingly, that by using particles whose size did not exceed 800 μm, the articles obtained by sintering the mixture of crumb alone, without binder or vulcanizing agent, have excellent mechanical properties. Indeed, the sintering is carried out by compressing and heating crumb mixture particles for a predetermined time in a mold. An article is thus obtained by sintering, the shape and dimensions of which article are close to the desired dimensions. Sintering leads to an agglutination of the particles due, on the one hand, to the coming together of the compressed particles and to the molecular mobility promoted by heating these particles, which creates bonds of the type of van der Waals forces between the particles, these bonds being stronger, the higher the specific surface area of the particles.

FIGS. 1a to 1e illustrate various steps of the operation for manufacturing an article made from a mixture of rubber crumb and salt particles inside a mold 1 introduced into a sintering press (not shown).

In the example illustrated, the mold 1 comprises a stationary part 1a comprising a base 2 of tubular general shape with a central axis 10 comprising a lower cavity 3 of annular general shape coaxial with the axis 10. At the bottom of the cavity 3 two cylindrical orifices 4 are made that have a circular cross section and a longitudinal axis 5 parallel to the central axis 10. Arranged in each orifice 5, with sliding means, is a rod 6 that has the role of ejecting the sintered article. The rods 6 are movable between an initial position at the bottom of the cavity 3, in which they seal the orifices 4, and a second position when they move upwards under the thrust of a jack to eject the sintered article. The base 2 of the mold supports, in its upper portion, two parts of annular shape, an external part 7 and an internal part 8 which are coaxial with the axis 10. The parts 7 and 8 define between them a tubular chamber 9 which communicates directly with the lower cavity 3 of the mold.

The mold 1 also comprises a mobile part 1b located above the stationary part 1a and which is caused to move in translation with respect to the latter. The mobile part 1b comprises a tubular piston 11 with an axis coaxial with the axis 10. The piston 11 is connected to the rod of a jack, for example a hydraulic jack (not shown), which it drives with a sliding movement parallel to the axis 10 inside of the stationary part, more particularly of the tubular chamber 9. The leading part of the piston 11 comprises an upper cavity 12, the shape and dimensions of which are connected to those of the lower cavity 3 and together define a sintering cavity which corresponds to the volume of the article which will be obtained by sintering. The various parts making up the mold 1 are rigid metal parts, made for example of steel.

Figure 1B:
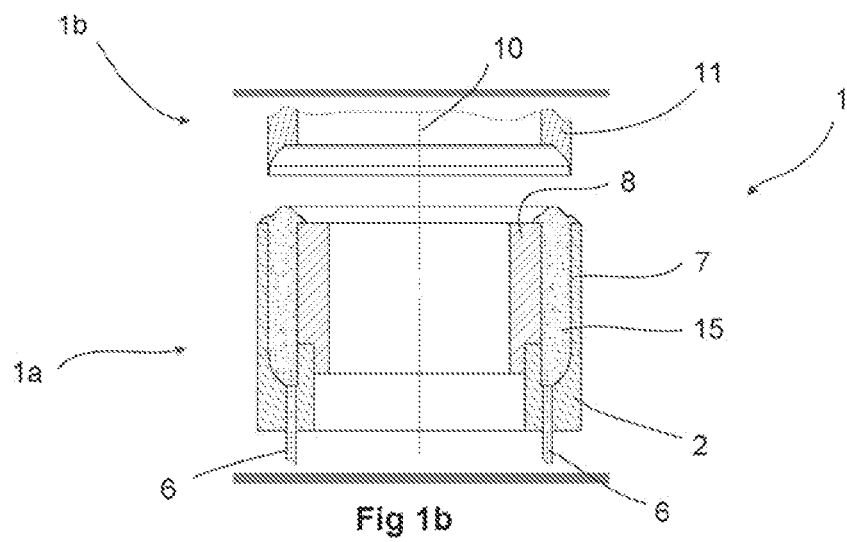
Figure 1C:
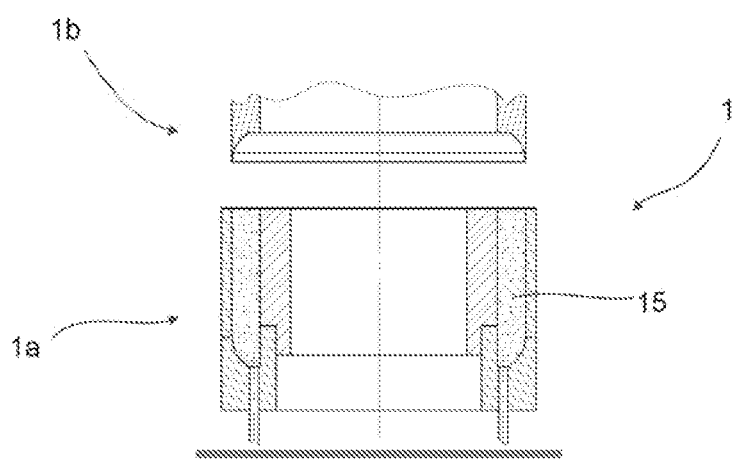

In what follows the various steps for manufacturing a sintered article made from a mixture of recovered rubber crumb and salt, referred to in the following as a crumb mixture, will be described. FIG. 1a illustrates the mold 1 open, in the initial state, before starting the sintering operation. FIG. 1b illustrates the mold 1 at the end of the operation for filling the lower cavity 3 and the tubular chamber 9 with crumb mixture 15, the mold still being open. FIG. 1c illustrates the mold 1 filled with crumb mixture, but in which the excess mixture resulting from the filling of the previous step has been removed, so that the crumb mixture does not protrude from the upper face of the lower part 1a of the mold.

Figure 1D:
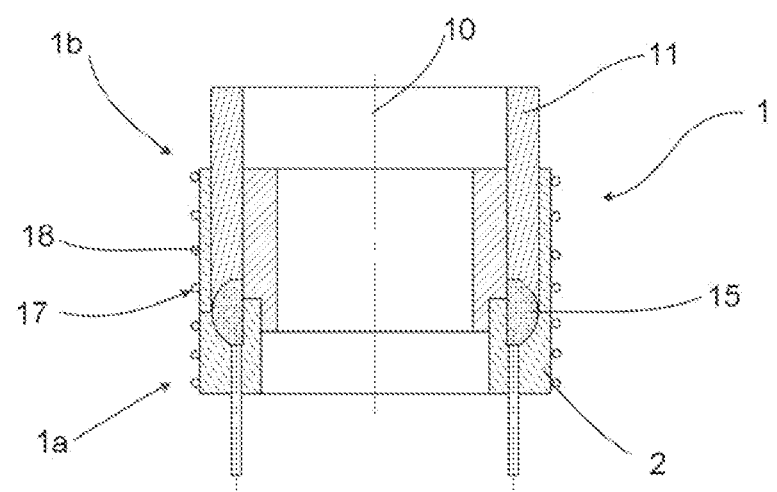

FIG. 1d illustrates the sintering step which consists of compacting and heating the crumb mixture. More precisely, the piston 11 descends inside the tubular chamber 9 and compresses the crumb mixture 15 until a predetermined nominal value of the pressure inside the sintering cavity is reached, this value being between 20 and 200 bar. The mold 1 comprises a temperature regulating device 17, comprising, for example, a tubular coil 18 in which a heat transfer fluid circulates and which surrounds the lower part 1a of the mold 1 (illustrated only in FIG. 1d). The temperature regulating device is connected to a control unit which allows the entry of fluid at a predetermined temperature inside the coil 18. Thus, during sintering, the control unit controls the sending of preheated heat transfer fluid so as to raise the temperature of the sintering cavity to the nominal sintering temperature which is between 100° C. and 150° C. Pressure is maintained in the sintering cavity for a predetermined time to enable air included in the crumb mixture and trapped in the sintering cavity to escape. This time is between 2 and 15 minutes.

At the end of the sintering operation, but before opening the mold, the sintered article is cooled to a temperature below 80° C. and preferably below 50° C. and more preferentially still is cooled to ambient temperature. This cooling is advantageously carried out by controlling a circulation of cooled heat transfer fluid in the coil 18 for a cooling period of between 5 and 20 minutes. It was observed that such cooling allows control of the final geometry of the sintered article and that there was therefore no swelling of the article after removal from the mold. The cooling makes it possible to extend the duration of the residence time of the sintered article under pressure, which ensures complete cohesion of the grains of the crumb mixture and avoids any porosity linked to an unwanted degree of air inclusion, while avoiding any elastic return of particles separated by excessively large or numerous pores. In addition, by cooling, any hot brittleness of the sintered article is avoided, the mechanical strength of the cooled sintered article being optimal and stabilized.

Figure 1E:
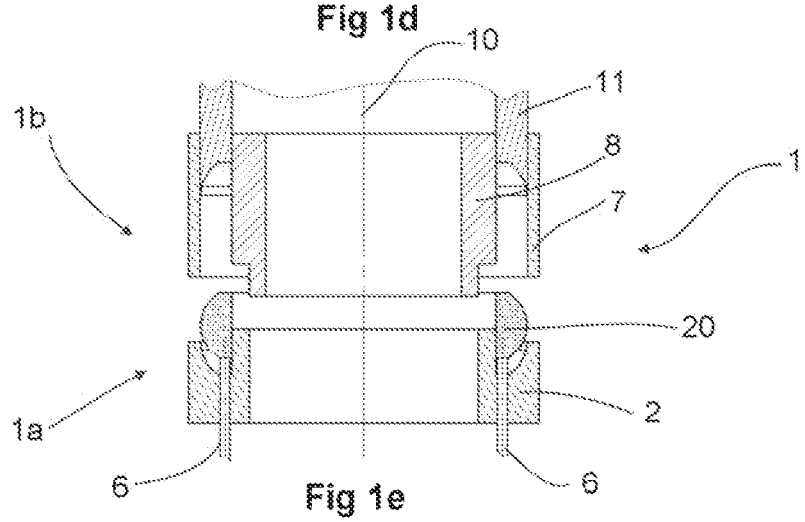

FIG. 1e illustrates the step of removing the sintered article from the mold, which is a pneumatic tire 20 in the example shown. For removal from the mold, the piston 11 and the external 7 and internal 8 parts are slid parallel to the axis 10 with respect to the base 2 and the ejection rods 6 are actuated which push the tire 20 out of the sintering cavity. The pneumatic tire 20 obtained by sintering is then removed from the mold 1.

In a preferred embodiment of the invention, the recovered rubber crumb has an average particle size (D50) of between 200 and 800 μm, preferentially of around 400 μm and the salt crumb a size equal to that of the rubber crumb particles.

Figure 2A:
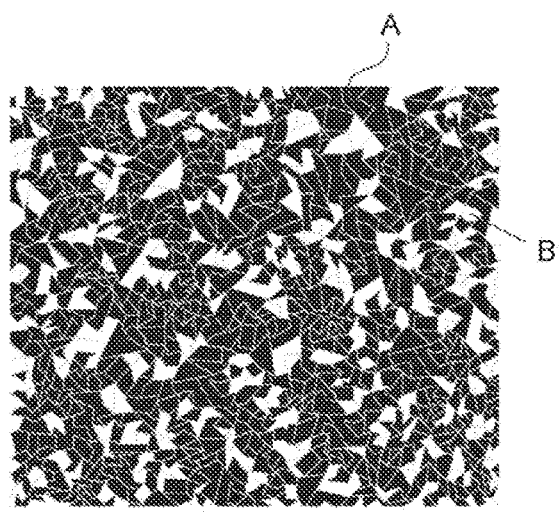
FIGS. 2a to 2f illustrate views on an enlarged scale of parts of sintered articles made from various mixtures of recovered rubber crumb and solute particles.
Figure 2B:
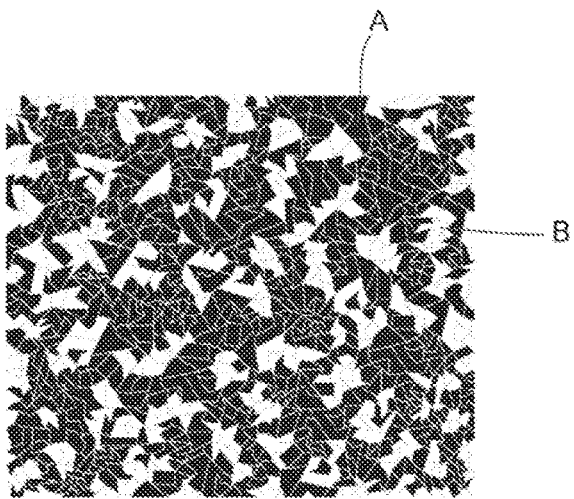
Figure 2C:
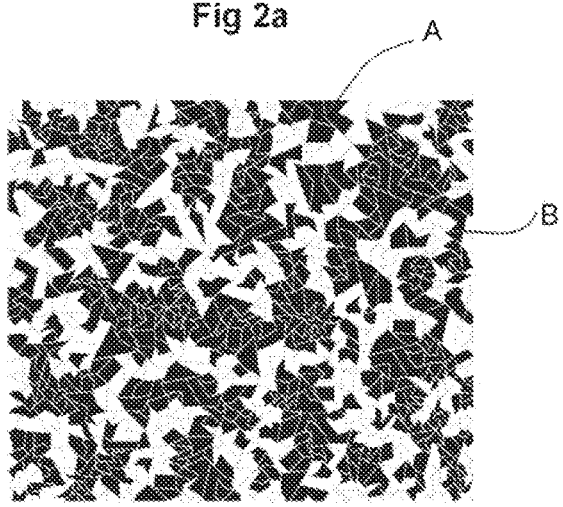
Figure 2D:
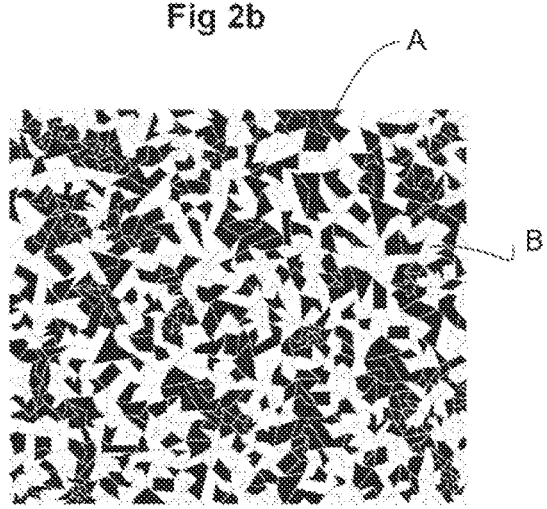
Figure 2E:
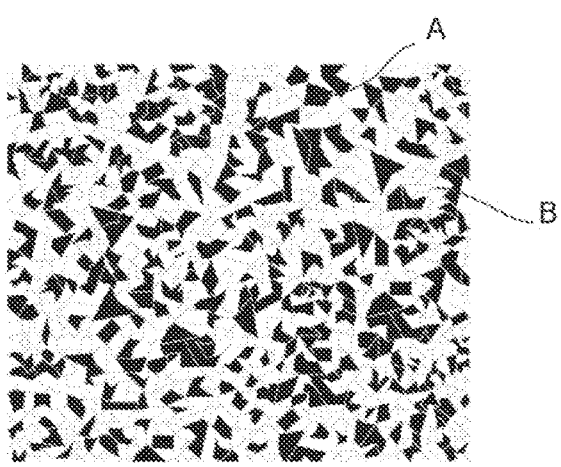
Figure 2F:
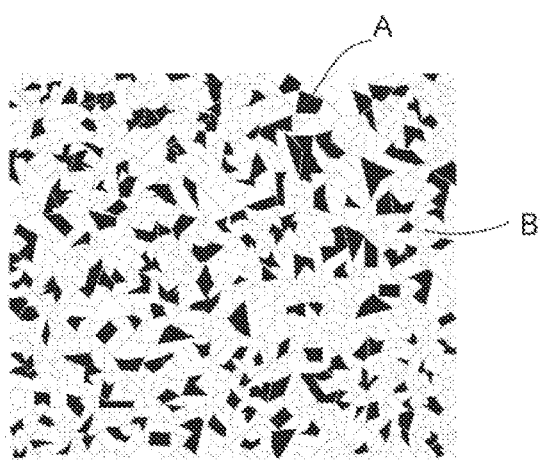

FIGS. 2a to 2f illustrate views on an enlarged scale of parts of sintered articles made from various mixtures of recovered rubber crumb A and salt particles B, here preferentially of substantially identical sizes. Thus, the mixture from FIG. 2a is composed of 76% (by volume) of rubber crumb particles A and 24% (by volume) of salt particles B. The mixture from FIG. 2b comprises 65% (by volume) of rubber crumb particles A and 35% (by volume) of salt particles B. The mixture from FIG. 2c is composed of 60% (by volume) of rubber crumb particles A and 40% (by volume) of salt particles B. The mixture from FIG. 2d comprises 50% (by volume) of rubber crumb particles A and 50% (by volume) of salt particles B. FIG. 2e illustrates a mixture composed of 38% (by volume) of rubber crumb particles A and 62% (by volume) of salt particles B and the one illustrated in FIG. 2f is a mixture of 24% (by volume) of rubber crumb particles A and 76% (by volume) of salt particles B.

In a preferred embodiment of the invention, the articles obtained by sintering a mixture of crumb and salt are immersed in a container containing water, which makes it possible to obtain a dissolution of the salt particles in the water, which dissolution creates cavities in the article. The size of the cavities is given by the size of the salt particles and their volume by the proportion of salt in the volume of the article. A rubber foam is thus obtained. Depending on the size and amount of salt particles in the crumb mixture, a closed-cell or open-cell foam is obtained.

In a variant of the invention, an article is produced by two successive sintering operations, in two different molds, of two different mixtures, the second being an overmolding of the first. Thus, a first sintered article is produced in a mold from a first mixture, according to the steps illustrated in FIGS. 1a to 1e, for example a mixture predominantly comprising rubber, of the type illustrated in FIG. 2a. The tire 20 is then introduced into a second mold of larger external diameter and the same operations are repeated with a second mixture of different composition, for example predominantly comprising salt, of the type illustrated in FIG. 2e. A sintered article made of two mixtures is thus obtained, the first mixture on the inside and the second on the outside. This article is for example a new pneumatic tire made of two different materials. Such an article can then be immersed in a container of water to obtain a rigid pneumatic tire comprising an outer layer in the form of foam. Owing to its porous surface nature, such a tire has good grip properties on the road.

In a variant, which is applicable whether the sintered article is obtained by a single sintering of a single mixture or by successive sinterings (overmolding one another) of mixtures of different compositions, it is possible to eliminate the last step consisting in immersing the article in a container of water and to proceed directly to the mounting of the sintered article, here the tire, on a rim. The porosity will then be obtained at the surface on contact with ambient humidity or on contact with existing water on the road, that is to say that the last step of dissolving solute particles by bringing the sintered article into contact with the appropriate solvent will in practice be carried out due to the use of said sintered article.

It will be noted that, advantageously, the invention makes it possible to create sintered articles, and in particular tires for pneumatic tires, capable of self-regeneration, in that, at a given initial instant, for example in an initial state which results from sintering and a first exposure to the solvent according to the invention, the article comprises on the one hand a compact part, forming a solid core, and within which the solid particles of solute have not been exposed to the solvent and have therefore not been dissolved by said solvent, and on the other hand a part in the form of foam, forming a peripheral casing within which at least a portion of the solute particles have been exposed to the solvent and dissolved by the solvent, and that, as the article wears down, which occurs starting from this initial instant, and more particularly as the surface layer of the casing formed of foam is abraded, the underlying core is gradually exposed to the solvent, which thus penetrates the peripheral layers of said core, contiguous to the initial foam casing, and therefore transforms, by dissolving the solute particles in said peripheral layers of the core, the initially compact, corresponding portion of the core into foam. In this way, the foam casing is regenerated as it wears down, gradually gaining on the core, which will for its part gradually shrink relative to the size it had at the aforementioned initial instant.

Whether the exposure of the sintered article to the solvent occurs directly via construction, during the process for manufacturing said article before use of said article, or else, progressively, during the use of said article, the penetration depth of the solvent in the sintered article, considered from the surface of the article, and which delimits the border between the compact core and the foam casing, will depend in particular on the volume proportion of the solid particles of solute within the mixture, and hence on the ability of the solvent to percolate through the compacted mixture. Indeed, the higher the proportion of solute particles, the more the islands of solute particles will communicate with one another by forming passages through the islands of rubber particles, which will facilitate the penetration of the solvent and the dissolution of the solute particles, and will therefore tend to increase the penetration depth. Conversely, a mixture that is denser in rubber particles, i.e. that contains a higher proportion of rubber particles, will tend to isolate the islands of solute particles from one another, and therefore to slow down the percolation of the solvent and therefore the dissolution of said solute particles, which will reduce the penetration depth, and therefore the thickness of the foam layer, while further preserving the integrity of the deeper layers.

Among the uses of the sintered articles obtained with the process of the invention, mention may be made of: tires for pneumatic tires, wheels or casters for scooters, inline skates, gyropods, etc., soles for shoes, floor coverings or underlayers for these, etc.

Of course, many modifications could be made to the invention without departing from the scope thereof, as defined in the claims.

Thus, use could be made of other types of solutes and their associated solvents, for example a thermoplastic material of high impact resistant polystyrene (HIPS) type as the solute associated with limonene, in particular d-limonene, as solvent.

Thus, for the purposes of the invention, it is possible to use a recovered rubber crumb obtained by another process, for example resulting from micronization using supercritical carbon dioxide, as described in patent application WO 2017/097859. It is also possible to use a recovered rubber crumb which has metal or textile inclusions.

It is also possible to immerse the sintered article in an ultrasonic bath in order to accelerate the dissolution of the solute by the solvent.

The invention claimed is:

1. A process for manufacturing an article made of recovered rubber crumb, wherein:
    a) crumb particles are mixed with particles of a solute;
    b) a molded article is produced by sintering the mixture from step a) alone in a mold under predetermined temperature and pressure conditions;
    c) the molded article is brought into contact with a solvent so as to dissolve at least one portion of the particles of said solute.

2. A process according to claim 1, wherein the crumb particles have an average size of less than 800 µm.

3. A process according to claim 1, wherein the average size of the particles of the solute is equal to or less than that of the crumb particles.

4. A process according to claim 1, wherein the proportion of solute in the mixture is between 1% and 80% of the total mass of the mixture.

5. A process according to claim 1, wherein said solvent is water and said solute is selected from: salt, a saccharide, a water-soluble protein or a water-soluble polymer.

6. A process according to claim 1, wherein the molded article from step b) obtained with a first mixture from step a) is placed in a second mold, introduced into which is a second mixture of crumb particles and said solute having a composition different from that of the first mixture, and a new molded article is then produced from the two mixtures.

7. A process according to claim 1, wherein the mixture is introduced into the mold and is subjected to a nominal temperature of between 100° C. and 150° C. and to a nominal pressure of between 20 and 200 bar for a time of between 2 and 15 minutes.

8. A process according to claim 7, wherein the mixture is introduced into the mold and is subjected to a nominal temperature of 120° C., at a pressure of 100 bar for a period of 10 minutes.

9. A process according to claim 1, wherein the process comprises a step of cooling the molded article in the mold.

* * * * *